United States Patent
Chowdhury

(10) Patent No.: US 12,225,093 B2
(45) Date of Patent: Feb. 11, 2025

(54) SYSTEMS AND METHODS FOR PROVIDING A HYDROCARBON REFINING TRAIN IIoT SERVICE

(71) Applicant: Saudi Arabian Oil Company, Dhahran (SA)

(72) Inventor: Md Fazlul Alam Chowdhury, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 68 days.

(21) Appl. No.: 18/358,669

(22) Filed: Jul. 25, 2023

(65) Prior Publication Data

US 2024/0220243 A1  Jul. 4, 2024

Related U.S. Application Data

(60) Provisional application No. 63/477,450, filed on Dec. 28, 2022.

(51) Int. Cl.
| | |
|---|---|
| *H04L 67/50* | (2022.01) |
| *G16Y 40/35* | (2020.01) |
| *G16Y 40/50* | (2020.01) |
| *H04L 67/12* | (2022.01) |

(52) U.S. Cl.
CPC .............. *H04L 67/50* (2022.05); *G16Y 40/35* (2020.01); *G16Y 40/50* (2020.01); *H04L 67/12* (2013.01)

(58) Field of Classification Search
None
See application file for complete search history.

(56) References Cited

U.S. PATENT DOCUMENTS

| | | | |
|---|---|---|---|
| 10,291,462 B1* | 5/2019 | Joyce | H04L 41/145 |
| 10,642,804 B2* | 5/2020 | Bagga | G06F 16/211 |
| 11,586,183 B1 | 2/2023 | Shao et al. | |
| 11,588,512 B2 | 2/2023 | Farahvash et al. | |
| 11,611,532 B1 | 3/2023 | Haefner | |
| 2021/0250641 A1* | 8/2021 | Aguiar | H04N 21/4223 |
| 2022/0083047 A1 | 3/2022 | Cella et al. | |
| 2023/0135882 A1 | 5/2023 | Cella et al. | |

* cited by examiner

*Primary Examiner* — Quang N Nguyen
(74) *Attorney, Agent, or Firm* — DINSMORE & SHOHL LLP

(57) ABSTRACT

Provided is a system for an industrial IoT (IIoT) service that includes a control system with a processor and a memory, the system being configured to provide an application programming interface (API) gateway to create a first microservice API that connects with a first plurality of networks of a first type that host a respective plurality of first IoT devices, and create a second microservice API that connects with a second plurality of networks of a second type that host a respective plurality of second IoT devices. The system may receive a request for device data from an IoT device, determine that the IoT device is located in one of the first plurality of networks, and communicate the request from a parameter output translation module to the first microservice API.

19 Claims, 7 Drawing Sheets

| Performance Measure | Train/Unit | Units | Time Scale | Min | Max | Tag Name | Current Value | Degradation Mechanism |
|---|---|---|---|---|---|---|---|---|
| Freed Gas Temp | Unit 474 TR #100 | Deg F | Online | | 46 | BGP_30-T421.PV | 103.58 | Acid Gas Dew Point Corrosion |
| Freed Gas Temp | Unit 474 TR #200 | Deg F | Online | | 46 | BGP_30-T421.PV | 103.58 | Acid Gas Dew Point Corrosion |
| Freed Gas Temp | Unit 474 TR #300 | Deg F | Twice per week | | 46 | BGP_30-T421.PV | 103.58 | Acid Gas Dew Point Corrosion |
| Lean DGA Strength | Unit 474 TR #100 | % | Twice per week | 35 | 50 | BGP_LW_11 0DGA.PV | 40.2 | Anime Corrosion |
| Freed Gas Temp | Unit 474 TR #200 | % | Twice per week | 35 | 50 | BGP_LW_11 1DGA.PV | 35 | Anime Corrosion |
| Freed Gas Temp | Unit 474 TR #300 | % | Twice per week | 35 | 50 | BGP_LW_11 2DGA.PV | 39.2 | Anime Corrosion |

FIG. 5

SYSTEMS AND METHODS FOR PROVIDING A HYDROCARBON REFINING TRAIN IIoT SERVICE

CROSS REFERENCE

This application claims the benefit of U.S. Provisional Application Ser. No. 63/477,450, filed Dec. 28, 2022, which is hereby incorporated by reference in its entirety.

BACKGROUND

Technical Field

Embodiments described herein generally relate to systems and methods for providing an industrial internet of things (IIoT) service and, more specifically, to providing an abstraction layer for more efficiently providing service, control, and feedback to industrial components.

Technical Background

In general, the Internet-of-Things (IoT) is a computing concept in which traditionally non-computing devices, such as appliances, lighting, fixtures, etc. are connected to the internet to allow a centralized entity to monitor energy usage, efficiency, and/or control the devices themselves. The Industrial Internet of Things (IIoT) refers to a similar concept, except where the devices that are being connected to the internet include factory equipment, manufacturing sensors, and/or other manufacturing and industrial devices. As will be understood, the potential for the IIoT is tremendous because of the potential for data collection, analysis, and improved efficiency of the devices and groups of devices. However, because of the vast number of devices that may be connected via an Hydrocarbon refining train IIoT system, problems arise in security, bandwidth, timeliness, and usability of the data.

As an example, in many current solutions, each application establishes trust with specific servers to get access to readings for tags of a specific facility. This data is not reusable and utilizes redundant data storage for data synchronization. As an example, plant information (PI) servers may connect computing devices to PI systems and communicate with corporate PI systems by passing the PI server name and necessary parameters to query specific information of equipment, from a PI server hosted by a location. This can be achieved by creating a trust agreement for PI Web Service host server for any PI server. However, if there are 1,000 applications that each connect to 58 PI servers, 58,000 connections will be required to effectively operate this system. Moreover, each application will need to have installed a software development kit (SDK) to connect. Such current solutions are costly, redundant and inefficient. As such, a need exists in the industry for an IIoT service.

SUMMARY

In one embodiment, a system for providing an industrial internet of things (IIoT) service includes a computing device with a processor and a memory component. The memory component stores logic that, when executed by the processor, causes the system to provide an application programming interface (API) gateway. The API gateway is configured to create a first microservice API that connects with a first plurality of networks of a first type that host a respective plurality of first refining train internet of things (IoT) devices, wherein the first microservice API stores routing data associated with the respective plurality of first IoT devices. The API gateway is further configured to create a second microservice API that connects with a second plurality of networks of a second type that host a respective plurality of second IoT devices. The second microservice API stores routing data associated with the respective plurality of second IoT devices. The API gateway is further configured to receive a request for device data from a IoT device. The request includes a tag name, a network type, time data, and a requester identity. The API gateway is further configured to determine from the network type that the IoT device is located in one of the first plurality of networks. The API gateway is further configured to communicate the request to the first microservice API. The first microservice API utilizes the routing data to determine which of the first plurality of networks the IoT device resides and establishes a tunnel with the IoT device. The API gateway is further configured to receive the device data via the tunnel.

In another embodiment, hydrocarbon refining train industrial internet of things (IIoT) system for providing an IIoT service includes a first plurality of refining train internet of things (IoT) devices coupled to a first network of a first type, a second plurality of refining train IoT devices coupled to a second network of a second type, a first refining train parameter module coupled to at least one of the first plurality of IoT devices, the first refining train parameter module configured to request data for the at least one of the first plurality of refining train IoT devices, and a second refining train parameter module coupled to at least one of the second plurality of refining train IoT devices, the second refining train parameter module configured to request data for the at least one of the first plurality of refining train IoT devices. Some embodiments include a hydrocarbon refining train parameter control system that includes a processor, a refining train parameter memory, and a refining train parameter output translation module. The refining train parameter memory may store a refining train control architecture that, when executed by the processor, causes the hydrocarbon refining train IIoT system to create a first microservice API that connects with the first network that hosts the first plurality of refining train IoT devices. The first microservice API may be configured to store routing data associated with the first plurality of refining train IoT devices. The refining train IIoT system may further create a second microservice API that connects with the second network of the second type that hosts the second plurality of refining train IoT devices, where the second microservice API stores routing data associated with the second plurality of refining train IoT devices. The refining train IIoT system may receive a request for device data for a refining train IoT device of the first plurality of IoT devices or the second plurality of refining train IoT devices, where the request includes a tag name, a network type, time data, and a requester identity. The refining train IIoT system may determine from the network type that the refining train IoT device is located in the first network of a plurality of networks of the first type and communicate the request from the refining train parameter output translation module to the first microservice API, where the first microservice API utilizes the routing data to determine which of the plurality of networks the refining train IoT device resides and establishes a tunnel with the refining train IoT device. In some embodiments the refining train IIoT system is configured to communicate, via the refining train parameter output translation module, the device data via the tunnel to the refining train IoT device.

In another embodiment, a method includes creating a first microservice API that connects with a first plurality of networks of a first type that host a respective plurality of first IoT devices. The first microservice API may be configured to store routing data associated with the respective plurality of first refining train IoT devices. The method may include creating a second microservice API that connects with a second plurality of networks of a second type that host a respective plurality of second IoT devices. The second microservice API stores routing data associated with the respective plurality of second IoT devices. Some embodiments include receiving a request for device data from an IoT device, where the request includes a tag name, a network type, time data, and a requester identity. Some embodiments include determining from the network type that the IoT device is located in one of the first plurality of networks and communicating the request to the first microservice API, where the first microservice API utilizes the routing data to determine which of the first plurality of networks the refining train IoT device resides and establishes a tunnel with the IoT device. Some embodiments include receiving the device data via the tunnel.

In yet another embodiment, a non-transitory computer readable medium includes computer readable instructions. When executed by a processor, the computer readable instructions cause a computing device to create a first microservice API that connects with a first plurality of networks of a first type that host a respective plurality of first IoT devices. The first microservice API may be configured to store routing data associated with the respective plurality of first IoT devices. The computer readable instructions further cause the computing device to create a second microservice API that connects with a second plurality of networks of a second type that host a respective plurality of second IoT devices. The second microservice API may be configured to store routing data associated with the respective plurality of second IoT devices. The computer readable instructions further cause the computing device to receive a request for device data from an IoT device, where the request includes a tag name, a network type, time data, and a requester identity. In some embodiments, the computer readable instructions cause the computing device to determine from the network type that the IoT device is located in one of the first plurality of networks. In some embodiments, the computer readable instructions further cause the computing device to communicate the request to the first microservice API, where the first microservice API utilizes the routing data to determine which of the first plurality of networks the IoT device resides and establishes a tunnel with the IoT device. The computer readable instructions may cause the computing device to receive the device data via the tunnel.

BRIEF DESCRIPTION OF THE DRAWING

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 5 depicts real time corrosion parameter values for different trains and assets by a Data Historian web service, according to embodiments provided herein;

DETAILED DESCRIPTION

Figure 1:
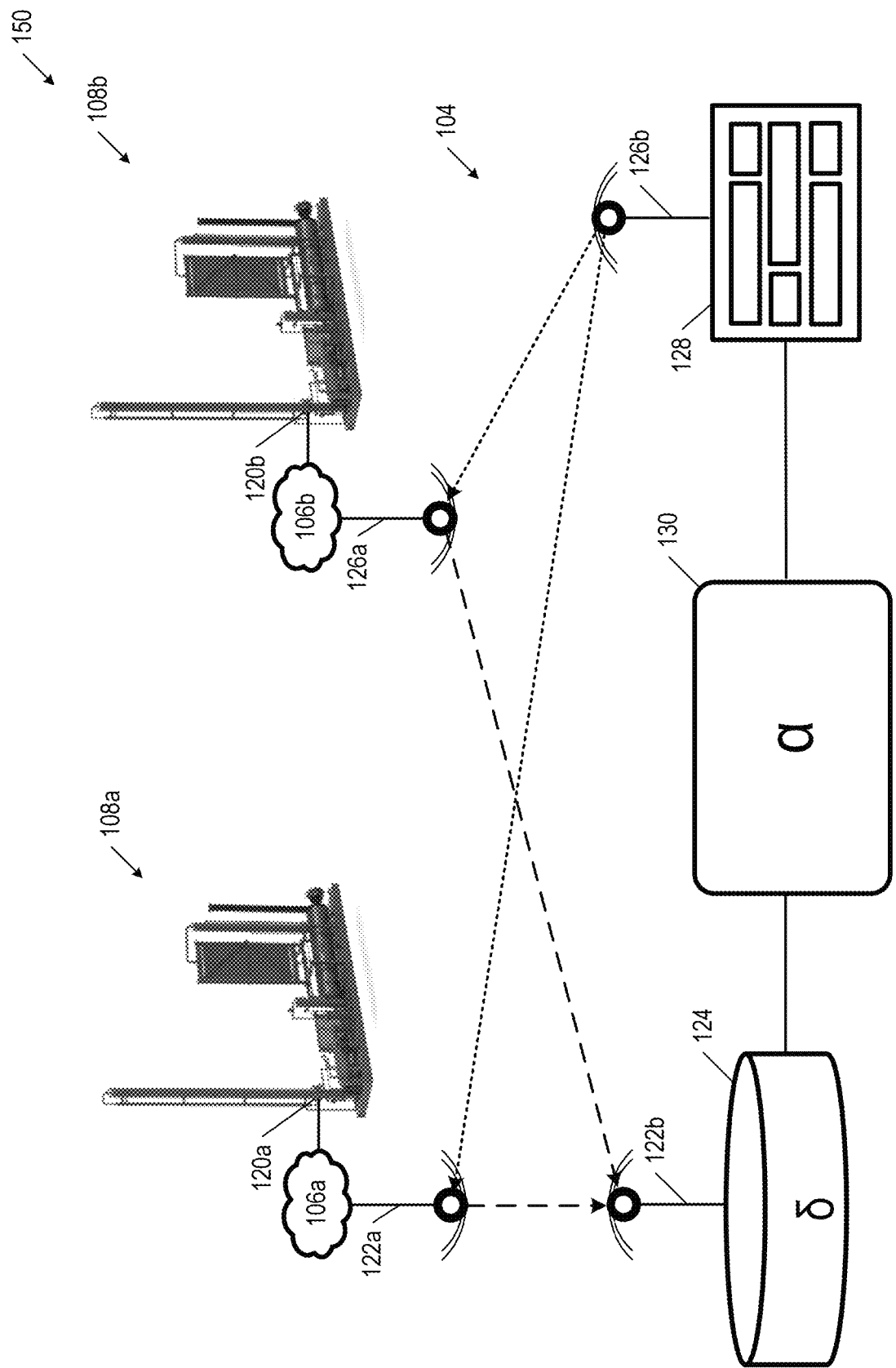
FIG. 1 depicts other hardware that provides input data and implementing results, according to embodiments provided herein.

Embodiments disclosed herein include systems and methods for providing an IIoT service. Embodiments of the IIoT service include a standardized web service-based medium that receives readings from microservices, such as data historians, DVR systems, and lab information systems in real-time basis. These embodiments create an abstraction layer, a data security layer, and/or a validation layer in front of the IIoT devices (data sources) to provide secured raw and validated/reconciled data to a computing device.

The IIoT service provides reusability of existing services, operating system/programming language independence, adaptability, and efficient monitoring of applications or business intelligence dashboards. The IIoT service is a low-maintenance, cost-efficient and effective way to get access to and store data, such as for PI data synchronization. The IIoT service also reduces potential impact on applications in the case of data historian or other microservice upgrades. As used herein, a "train" refers to a series of various components, including valves, actuators, instrumentation, sensors, gauges, piping, reactors, separators, and the like, used to process, purify, and convert hydrocarbon gases to forms of saleable hydrocarbon gas.

Using the microservices provided herein (e.g., data historian and DVR), the IIoT service can collect large amounts of data from numerous data sources and deliver them to the subscribed systems (e.g., line of business systems, operational applications, etc.) in a simplified, standardized and secured approach. These embodiments may communicate with the large data sets using an abstraction layer in front of the IIoT data sources and adds additional data security and validation layer to provide secured raw and validated/reconciled data to the end systems in real-time. ODATA services can be used to retrieve IIoT time series data into corporate applications.

Using embodiments of the IIoT service provided herein, a subset of devices can report to a server and/or API with additional data and added security. For example, if a device is authorized to have data for a Plant A and Plant A is connected to server A, the device will not be able to retrieve data from a Plant B which is connected to server B.

Embodiments of the IIoT service can retrieve associated real-time readings and data through a secured data tunnel and from above systems without creating individual connection to respective system, defining trust and individual trust/security and without having extensive knowledge that is required to build on-line connection on above defined systems. This reduces the need for installing/configuring individual data historian or DVR microservices for each solutions or systems.

Embodiments of the IIoT service can connect company assets on a real-time basis and retrieve connected readings to deploy the IIoT service, as a single medium through which line of business systems can interact with corporate assets or the IIoT service on a real-time basis. The IIoT service can be developed, installed, and configured in industrial revolution 4.0 center and other corporate systems, such as asset integrity management solution (AIMS), corrosion monitoring solution (CMS), energy intensity monitoring solution (EII), refining and petro-chemical analytic solution (RPS), management of hydrocarbon and loss accounting solution (MHCL). Embodiments of the IIoT service may be utilized in any asset centric organizations (e.g., oil/gas, utilities, and laboratories) that use data historian or data validation and reconciliation systems for online readings from IIoT devices. This IIoT service can be implemented across solutions that deal with online readings from IIoT devices/assets.

Referring now to the drawings, FIG. 1 depicts a hydrocarbon refining train IIoT system 150 that provides input data and implements results from IIoT devices, according to embodiments provided herein. As illustrated, the hydrocarbon refining train IIoT system 150 includes one or more IoT devices, such as refining train IoT devices 108a, 108b. The refining train IoT devices 108a, 108b may include refining train parameter modules 120a, 120b that may request device data. The refining train parameter module 120a may be coupled to and/or part of a PI network 106a, as described in more detail with reference to FIG. 2. Similarly, the refining parameter train module 120b may be coupled to a DVR network 106b (described in more detail with reference to FIG. 3). In some embodiments, the refining train parameter modules 120a, 120b may include and/or be coupled to at least one storage device that stores an identifier of the refining train IoT device, a type of the refining train IoT device, and/or other device data. The refining train parameter modules 120a, 120b may include a computing device for communicating via its respective network and may include and/or be coupled with a transmitter 122a, 126a (which may be configured as a transmitter, receiver and/or a transceiver) for communicating the device data from refining train parameter module 120 to the hydrocarbon refining train parameter control system 104. In operation, the refining train parameter modules 120 may include one or more sensors and/or may be configured to detect a state of the refining train IoT device 108. In some embodiments, the refining train parameter modules 120 may be configured to receive instructions and control the refining train IoT device 108.

It will be understood that on networks that have a plurality of different refining train IoT devices 108, each refining train IoT device 108 may be equipped with a radio frequency (RF) tag or other transmitter that may broadcast or otherwise communicate this device data to the hydrocarbon refining train parameter control system 104. In some embodiments, each refining train IoT device 108 may be coupled with a computing device that collects and organizes the data before sending to the hydrocarbon refining train parameter control system 104. The refining train IoT device 108 may include one or more petrochemical generation systems or corrosion management systems, such as a Girbotol process, as well as sub-devices within the aforementioned, including but not limited to reactors, valves, actuators, instrumentation, sensors, gauges, piping, reactors, separators, and the like. In one non-limiting example, and as explained in further detail below with respect to FIG. 5, the refining train IoT device 108 may be a corrosion management system, including one or more acid gas treatment units, that may monitor trends in various parameters of a feed gas as the acid gas is removed. The one or more acid gas treatment units may include those typically present in a Girbotol process, including but not limited to coolers, amine absorbers (including water washing sections), knock-out/flash drums, regenerators/stripper columns, reboilers, flash drums, or combinations thereof.

It should also be understood that "device data" may include identifiers of the respective refining train IoT device 108, data related to the network of the refining train IoT device 108, requests from the refining train IoT device 108, instructions from the refining train IoT device 108, and/or other data associated with the refining train IoT device 108.

The hydrocarbon refining train parameter control system 104 may include and/or be coupled with one or more receivers 122b (which may be configured as a transmitter, receiver and/or a transceiver) for receiving the device data from the refining train parameter module 120 associated with a plurality of different devices. Depending on the embodiment, the hydrocarbon refining train parameter control system 104 may receive device data from dozens, hundreds, or even thousands of different refining train IoT devices 108. The hydrocarbon refining train parameter control system 104 may include refining train parameter memory 124 (denoted in FIG. 1 as 8) for storing the received IoT device data. Depending on the particular embodiment, the refining train parameter memory 124 may be configured as random access memory (RAM), read only memory (ROM), registers, a database, and/or other hardware for storing the device data.

Refining train control architecture 130 (represented in FIG. 1 with a), represents software modules and/or operations that are created and/or utilized by the hydrocarbon refining train parameter control system 104, as described herein. The refining train control architecture 130 connects with a first plurality of networks of a first type (e.g., the PI network 106a and/or the DVR network 106b) that host the refining train IoT device 108 and other IoT devices. The refining train control architecture 130 may be configured to cause the refining train parameter memory 124 to store routing data associated with the refining train IoT device 108. The refining train control architecture 130 may include one or more pieces of software and may be configured establishing a tunnel for receiving device data from the refining train IoT device 108, as described with reference to FIGS. 2-8.

The hydrocarbon refining train parameter control system 104 may also include a refining train parameter output translation module 128 that is configured to create and/or communicate instructions for establishing the tunnel (depicted with small dashed lines) to the refining train IoT device 108. The refining train parameter output translation module 128 may include any hardware configured to translate the output of the refining train control architecture 130 into a form that can be used to communicate and/or control the refining train IoT device 108. For example, the refining train parameter output translation module 128 may include a hardware driver or controller, a control data transmitter 126b, a document printer, a data display, and/or any other hardware that generates an operations output that can be used to alter, enhance, or otherwise control technical operations or create a technical effect described herein. The refining train parameter output translation module 128 may be configured as part of the refining train control architecture 130 and/or may be configured as a separate piece of hardware and/or software.

Figure 2:
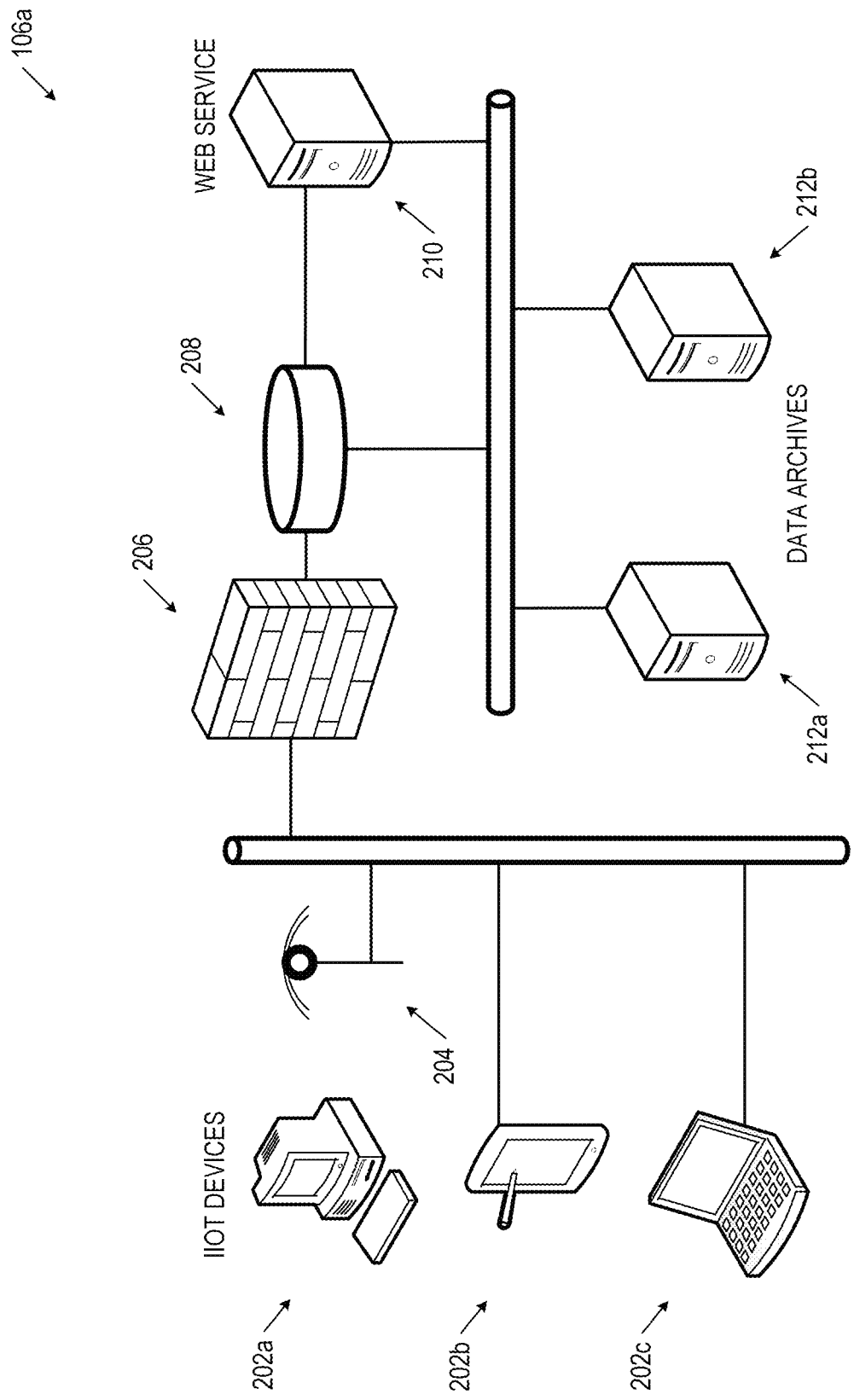
FIG. 2 depicts a computing environment that utilizes a service architecture, according to embodiments provided herein.

FIG. 2 depicts the PI network 106a of FIG. 1 that utilizes a service oriented architecture (SOA) including computing devices 202 (e.g., 202a, 202b, and 202c), IIoT service component 204, a data security layer component 206, a data validation layer 208, data historian service component 210, and data archives in the form of ODATA service components 212a, and 212b. Computing devices 202 can send the data through wired or wireless communication through any system that can receive real time series data from the computing devices 202. Data is sent to PI network 106a to be historized. As depicted in FIG. 2, the computing devices 202 connect to a unified medium (e.g., IIoT service component 204) containing data from data historian service component 210. This intermediary system reads PI tag coming from a certain facility with a server to know which service to connect and send the data. The IIoT service component 204 may be referred to as a service bus, service medium, and/or abstraction layer.

In some embodiments, IIoT data may be received from one or more IIoT devices (not shown in FIG. 2). The IIoT data (also referred to as tag data or tags) may be pulled periodically, continuously, and/or on-demand upon receiving a request from one or more of the computing devices 202. Regardless, when IoT data is sent to one or more of the computing devices (such as hydrocarbon refining train parameter control system 104), the IoT data and/or the requesting computing devices may be subject to a security scan by a data security layer component 206 and the data may be validated via a data validation layer 208, as discussed in more detail below.

Data security layer component 206 includes a mechanism configured to isolate a data layer and employ mufti-level security. The data security layer component 206 can protect data transfer and storage and be used to reduce the risk of loss of IIoT data. As an example, data security layer component 206 can use disk encryption and/or two-factor authentication.

Data validation layer 208 is configured to provide data validation, reconciliation, and cleansing capabilities. The data validation layer is configured to receive data from the data historian service, validate the data under certain models or logics, and fix data anomalies and/or incorrect readings.

Figure 3:
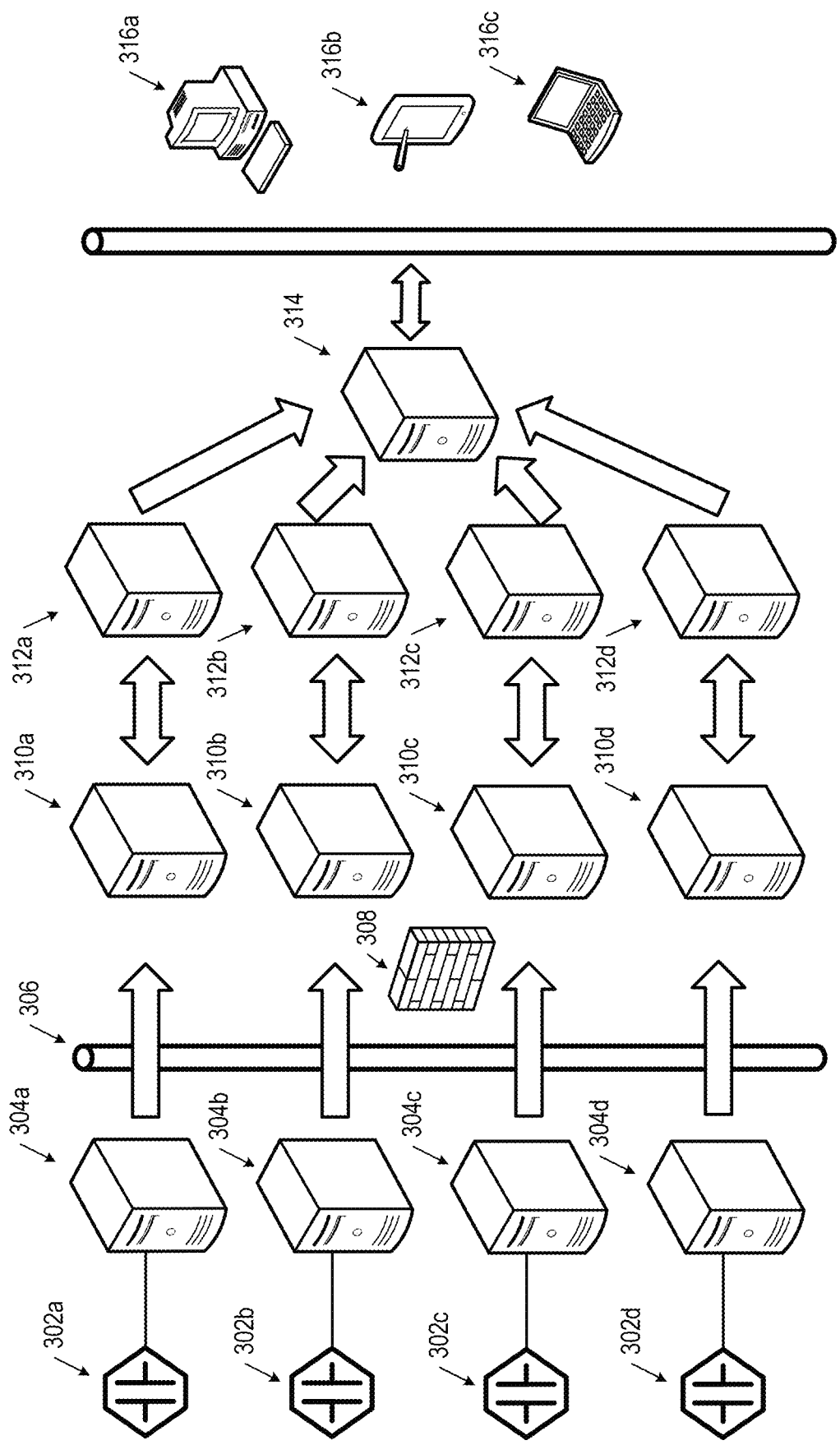
FIG. 3 depicts a computing environment that utilizes data validation and reconciliation (DVR) web and open data protocol (ODATA) service architecture, according to embodiments provided herein.

FIG. 3 depicts a computing environment that utilizes a DVR web and ODATA service architecture, according to embodiments provided herein. The DVR web and ODATA service is an SOA-based service application through which computing devices 316 (e.g., 316a, 316b, and 316c), can communicate with DVR models to collect real-time readings 302 (e.g., 302a, 302b, 302c, and 302d) from IoT devices, such as instruments, sensors, gauges, and/or the like for data historian services 304.

The IIoT service component 306 isolates the data and may employ mufti-level security mechanisms. This service can be incorporated with an enterprise service bus or cloud-based service network at a later stage. The IIoT service component 306 reduces the need for communication through a plurality of DVR models 312 (e.g., 312a. 312b, 312c, and 312d) from, clients, or end systems and can request DVR readings associated data historian tags through this communication mechanism. The DVR models 312 are mapped and updated into the configuration database 314. The configuration database 314 can be updated for existing or additional DVR models 312 without changing the connection of the web service. A unified DVR web service or data validation layer component (similar to data validation layer 208) includes DVR Data archival services; archived DVR data on an hourly breakdown; DVR Data Snapshot Service; the most recent DVR value of a particular tag; DVR data averaging services; daily averages of DVR values for a certain time period; DVR data totalizer services; and daily totals of DVR values for a certain time period.

As also shown in FIG. 3, IIoT service component 306 provides secured raw and validated/reconciled data from data historian services 304 to computing devices 316. These embodiments provide a web service by introducing SOA through single object access protocol (SOAP). The computing device 316 provides a specific data historian tag name (instrumentation and/or calculation tags) together with time period and facility identifier. The DVR mapping mechanism may determine and respond with the mapping information. The DVR mapping mechanism may communicate through appropriate DVR model 312 to retrieve validated data for certain instruments or inline calculations. The SOA prevents a need for direct connectivity of DVR models 312 for each application, information for associated DVR models 312 or data historian service 310, and any impact on applications in case of DVR model 312 or data historian service 310 upgrades.

Figure 4:
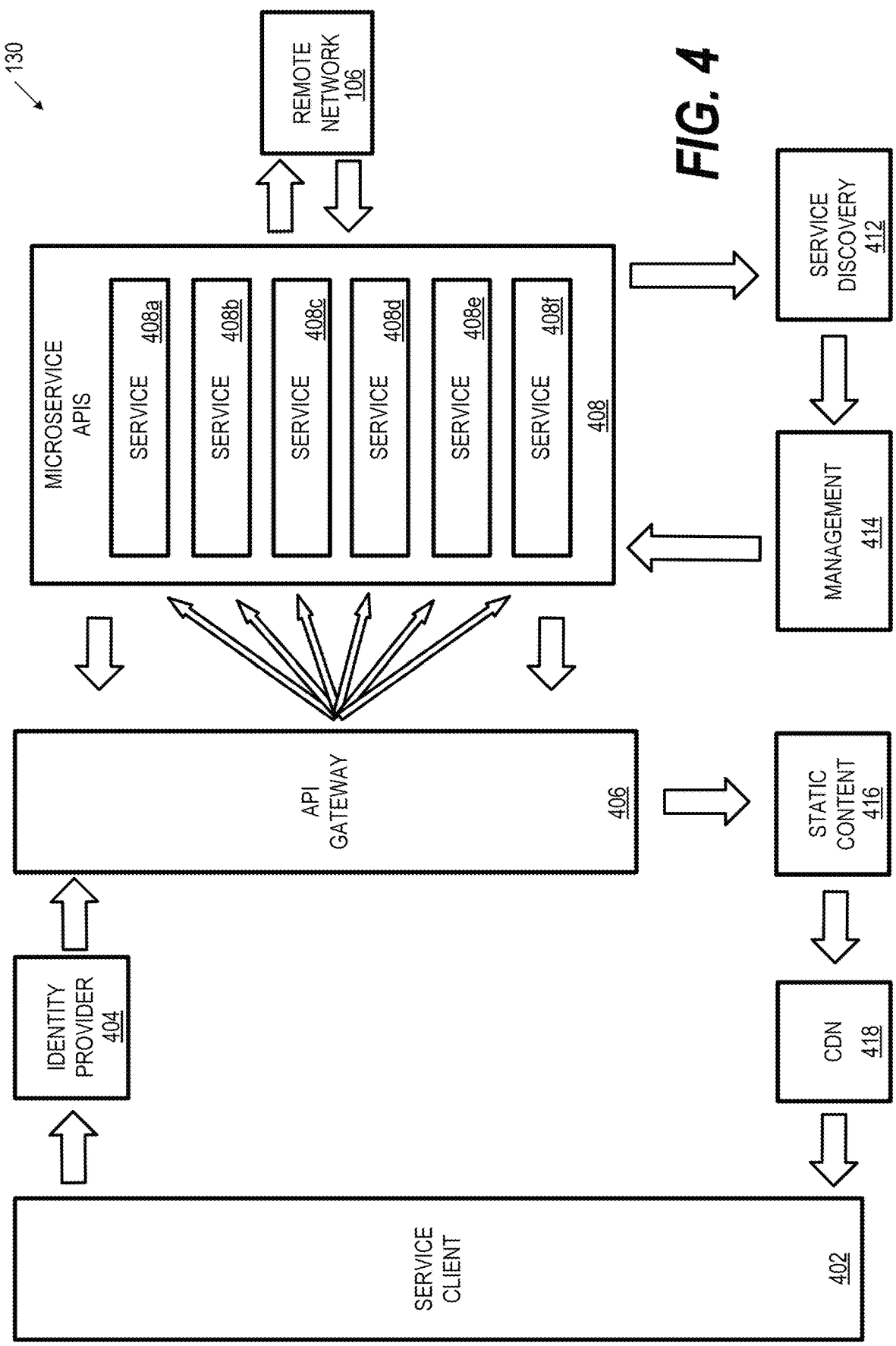
FIG. 4 depicts an exemplary refining train control architecture of microservices of the IIoT service, according to embodiments provided herein.

FIG. 4 depicts a refining train control architecture 130 providing an exemplary SOA in which computing devices 202 can retrieve real-time data through IIoT data subscription mechanisms. The refining train API gateway 406 uses identity provider 404 for computing devices 402 along with microservice APIs 408. Identity provider 404 may be configured to confirm an identity of the requester. In an example, refining train API gateway 406 takes a user credential and passes it through the identity provider 404 to microservice APIs 408 to see if the user has access to a server. A user's request may be allowed if user access is allowed and rejected if user access is not allowed.

As depicted in FIG. 2, computing devices 402 can communicate with refining train API gateway 406 (similar to IIoT service component 306 from FIG. 3). Refining train API gateway 406 may be configured as one or more APIs, gateways, and/or other data integration elements (such as brokers, bridges, connectors, or the like). The refining train API gateway 406 may be configured as an abstraction layer, a data security layer, and/or a validation layer. The computing devices 402 can communicate through the refining train API gateway 406 to access microservice APIs 408 (e.g., 408a, 408b, and 408c) such as time-series data acquisition systems (e.g., data historian and ODATA systems).

In some embodiments, Refining train API gateway 406 (similar to IIoT service component 306) may utilize at least two microservice APIs 408 and can be extended to numerous other data acquisition systems through service or data adapters. Specifically, microservice APIs 408 may include a PI network similar to 106a of FIGS. 1 and 2, also known as a time-series data acquisition system (e.g., data historian and ODATA) and a data quality microservice (e.g., DVR and ODATA service. The time-series data acquisition system can be microservice API 1 (408a) and a data quality microservice can be microservice API 2 (408b), for example. The data historian microservice may be configured as a time-series data acquisition system and may be configured to track, monitor, down sample, and/or aggregate measurements or events over time. The data quality microservice may be configured to measure of the condition of data based on factors such as accuracy, completeness, consistency, reliability and/or whether data is up to date.

Other microservices can be added. For example microservice API 3 (408c) could be lab information systems data. Similar to the first microservice and second microservice, the third microservice can connect to a third plurality of networks of a third type that host a respective plurality of third IoT devices. The third microservice API may store routing data associated with the respective plurality of third IoT devices.

The data historian service may be configured as a time-series data acquisition system that retrieves readings from IIoT devices such as smart sensors or actuators and establishes records using unstructured data format, which is easier to retrieve and capable of managing huge amounts of data or big data. Time-series data can capture data increments as small as milliseconds and establish records according to date and time. Data from IIoT devices, such as sensors, intelligent electronic devices (IEDs), distributed control systems (DCSs), programmable logic controllers, lab instruments can be captured through data historian service.

The SOA may use data from microservice APIs 408 along with a service discovery component 412 that is configured to detect IoT devices and microservices on the plurality of networks. The SOA may also use a management component 414 that is configured to establish the tunnel with the refining train IoT device 108 for device data. Data from microservice APIs 408 then gets sent back to Refining train API gateway 406, then to static content component 416. The static content component 416 is configured to store and transfer static device data. The static device data can then be sent to content delivery network (CDN) 418 which is configured to control a speed and volume of delivery of device data. The data can then be sent back to computing devices 402.

FIG. 5 depicts real-time corrosion parameter values for different trains and assets by a data historian service 310 from FIG. 3. The data historian service 310 may be configured to monitor and document various data elements. In this example, various metrics are shown associated with different tags can be retrieved and displayed in real-time. For example, in corrosion management systems such as a Girbotol process, the various metrics (and associated data) that may be measured may include flow rate of the various streams into and/or exiting the various units, temperatures of the various streams into, within, and/or exiting the various units, pressures of the various streams into, within, and/or exiting the various units, fluid levels within the various units, concentrations of acid gas (including $H_2S$ and $CO_2$, among other corrosive gas species) in the various stream into, within, and/or exiting the various units, concentrations of amine within the rich amine stream exiting the absorber and/or entering the regenerator, concentrations of amine within the lean amine stream exiting the regenerator and/or entering the absorber, estimated percentages or growth rate of degraded amine salts within the amine streams, or any combination of the previous.

The hydrocarbon refining train parameter control system 104 (FIG. 1) may request raw data and/or a validated readings, such as from the above. Each piece of data may be connected to a tag from the hydrocarbon refining train parameter control system 104 and require authentications. Some embodiments may be configured to further control one or more functions of a refining train IoT device 108 (FIG. 1).

In some embodiments, the data historian service 310 (FIG. 3) may also create visual displays of various data elements requested by hydrocarbon refining train parameter control system 104 (FIG. 1) in real-time (or near-real time). The DVR microservice may be configured to monitor and document various data. The DVR microservice archives accumulate various data elements by retrieving the validated data for certain instruments or inline calculations.

Figure 6:
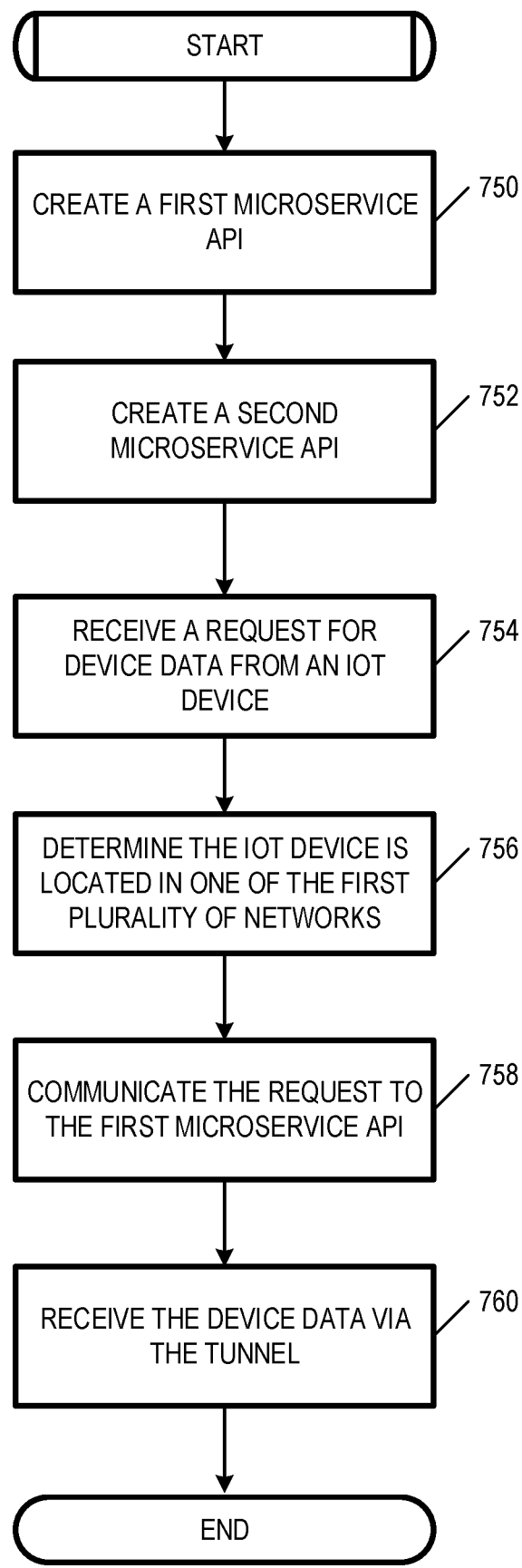
FIG. 6 depicts a flowchart of a method of an IIoT service component, according to embodiments provided herein.

FIG. 6 depicts a flowchart of a method of an IIoT service component. As illustrated in block 650, a first microservice API is created that connects with a first plurality of networks of a first type that host a respective plurality of first refining train internet of things (IoT) devices. The first microservice API stores routing data associated with the respective plurality of first refining train IoT devices. In block 652, a second microservice API is created that connects with a second plurality of networks of a second type that host a respective plurality of second refining train IoT devices. The second microservice API stores routing data associated with the respective plurality of second refining train IoT devices.

In block 654, a request for device data may be received from a refining train IoT device. The request may include a tag name, a network type, time data, and a requester identity. In block 656, a determination may be made from the network type that the refining train IoT device is located in one of the first plurality of networks. In block 658, the request may be communicated to the first microservice API, where the first microservice API utilizes the routing data to determine which of the first plurality of networks the refining train IoT device resides and establishes a tunnel with the refining train IoT device. In block 660, the device data may be received via the tunnel.

Figure 7:
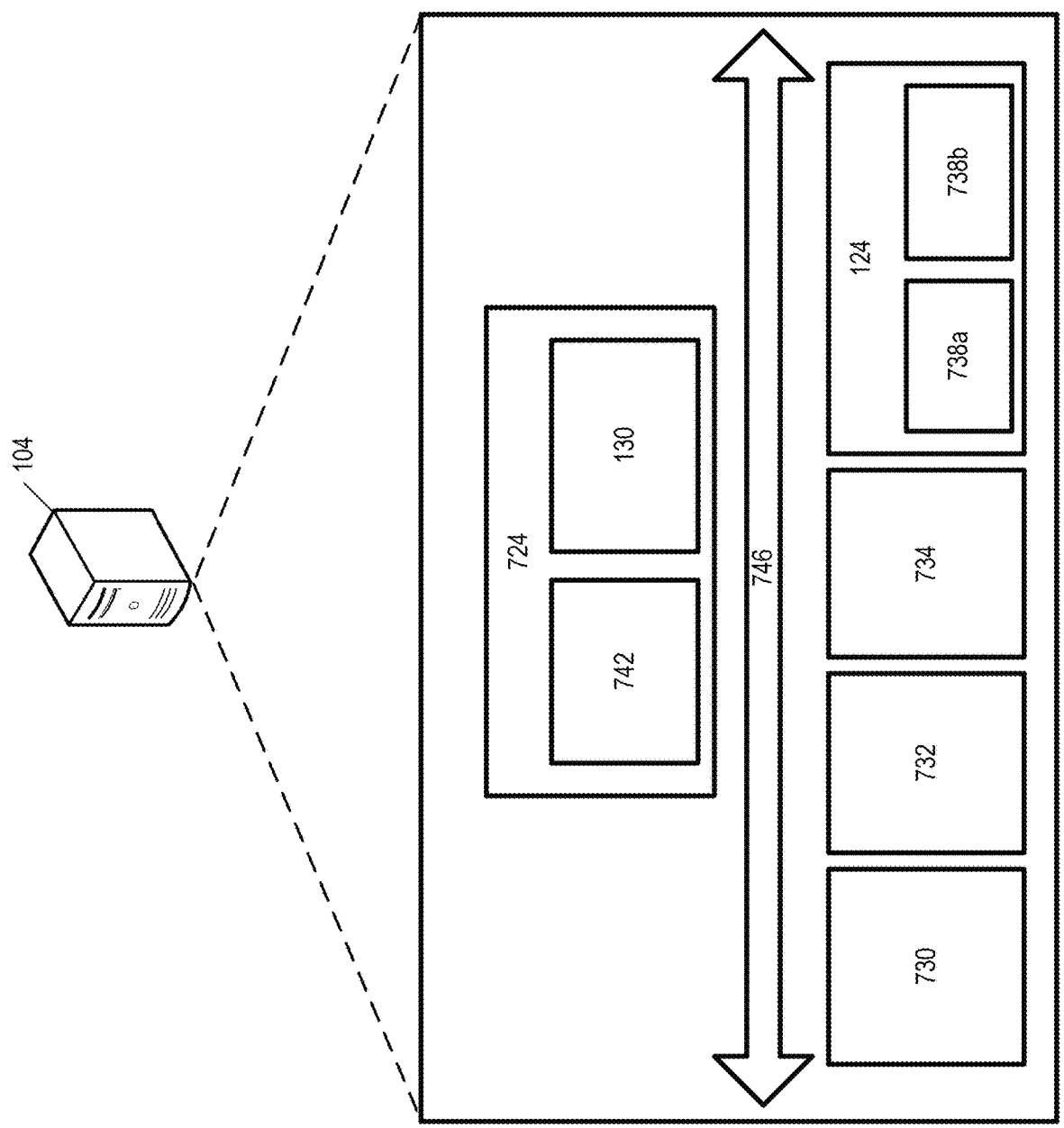
FIG. 7 depicts a computing environment that may provide IIoT service, according to embodiments provided herein.

FIG. 7 depicts hydrocarbon refining train parameter control system 104 (of FIG. 1) for providing IIoT service, according to embodiments provided herein. As illustrated, the hydrocarbon refining train parameter control system 104 includes a processor 730, input/output hardware 732, a network interface hardware 734, a refining train parameter memory 124 (which stores device data 738a, location data 738b, and/or other data, such as abstraction layer data), and a memory component 724. The memory component 724 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. Depending on the particular embodiment, these non-transitory computer-readable mediums may reside within the hydrocarbon refining train parameter control system 104 and/or external to the hydrocarbon refining train parameter control system 104.

The memory component 724 may store operating logic 742 and refining train control architecture 130. Both of these logic components may include a plurality of different pieces of logic (such as depicted in FIG. 4), each of which may be embodied as a computer program, firmware, and/or hardware, as an example. A local communications interface 746 is also included in FIG. 7 and may be implemented as a bus or other communication interface to facilitate communication among the components of the hydrocarbon refining train parameter control system 104.

The processor 730 may include any processing component operable to receive and execute instructions (such as from a data storage component 736 and/or the refining train parameter memory 124). As described above, the input/output hardware 732 may include and/or be configured to interface with speakers, microphones, and/or other input/output components.

The network interface hardware 734 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices.

From this connection, communication may be facilitated between the hydrocarbon refining train parameter control system 104 and other computing devices.

The operating logic 742 may include an operating system and/or other software for managing components of the hydrocarbon refining train parameter control system 104. As discussed above, the refining train control architecture 130 may reside in the memory component 724 and may be configured to cause the processor 730 to create the microservice APIs 408 (FIG. 4) and/or perform other functions provided herein.

It should be understood that while the components in FIG. 7 are illustrated as residing within the hydrocarbon refining train parameter control system 104, this is merely an example. In some embodiments, one or more of the components may reside external to the hydrocarbon refining train parameter control system 104 or within other devices. It should also be understood that, while the hydrocarbon refining train parameter control system 104 is illustrated as a single device, this is also merely an example. In some embodiments, the operating logic 742 and the refining train control architecture 130 may reside on different devices.

Additionally, while the hydrocarbon refining train parameter control system 104 is illustrated with the operating logic 742 and the refining train control architecture 130 as separate logical components, this is also an example. In some embodiments, a single piece of logic may provide the described functionality. It should also be understood that while the operating logic 742 and the refining train control architecture 130 are described herein as the logical components, this is also an example. Other components may also be included, depending on the embodiment.

As illustrated above, various embodiments for providing secured raw and validated/reconciled data to end systems are disclosed. These embodiments may be configured to provide increased data security and validation using DVR. These embodiments may also be configured to operate in different IIoT environments, thus allowing for expanded functionality of the increased security.

Various aspects for providing an industrial internet (IIoT) services are disclosed. Specifically, a first aspect includes a hydrocarbon refining train industrial internet of things (IIoT) system for providing an IIoT service, comprising: a first plurality of refining train internet of things (IoT) devices coupled to a first network of a first type; a second plurality of refining train IoT devices coupled to a second network of a second type; a first refining train parameter module coupled to at least one of the first plurality of IoT devices, the first refining train parameter module configured to request data for the at least one of the first plurality of refining train IoT devices; a second refining train parameter module coupled to at least one of the second plurality of refining train IoT devices, the second refining train parameter module configured to request data for the at least one of the first plurality of refining train IoT devices; a hydrocarbon refining train parameter control system that includes a processor, a refining train parameter memory, a memory component, and a refining train parameter output translation module, the memory component storing a refining train control architecture that, when executed by the processor, causes the hydrocarbon refining train IIoT system to perform at least the following: create a first microservice API that connects with the first network that hosts the first plurality of refining train IoT devices, wherein the first microservice API stores routing data associated with the first plurality of refining train IoT devices; create a second microservice API that connects with the second network of the second type that hosts the second plurality of refining train IoT devices, wherein the second microservice API stores routing data associated with the second plurality of refining train IoT devices; receive a request for device data for a refining train IoT device of the first plurality of IoT devices or the second plurality of refining train IoT devices, wherein the request includes a tag name, a network type, time data, and a requester identity; determine from the network type that the refining train IoT device is located in the first network of a plurality of networks of the first type; communicate the request from the refining train parameter output translation module to the first microservice API, wherein the first microservice API utilizes the routing data to determine which of the plurality of networks the refining train IoT device resides and establishes a tunnel with the refining train IoT device; and communicate, via the refining train parameter output translation module, the device data via the tunnel to the refining train IoT device.

A second aspect includes the first aspect, wherein the first microservice API includes at least one of the following a data historian service component, an open data protocol (ODATA) service component, a DVR system, or a lab information system.

A third aspect includes the first aspect and/or the second aspect, wherein the first microservice API utilizes the requester identity to determine whether the refining train IoT device that requested the refining train IoT device is authorized to access the device data.

A fourth aspect includes any of the first aspect through the third aspect, wherein the refining train control architecture further creates a third microservice API that connects with a third plurality of networks of a third type that host a respective plurality of third refining train IoT devices, wherein the third microservice API stores routing data associated with the respective plurality of third refining train IoT devices.

A fifth aspect includes any of the first aspect through the fourth aspect, wherein the logic further causes the hydrocarbon refining train IIoT system to provide a service client that is configured to receive the request for the device data and provide the request to an refining train API gateway of the refining train control architecture.

A sixth aspect includes any of the first aspect through the fifth aspect, wherein the logic further causes the hydrocarbon refining train IIoT system to provide an identity provider that is configured to confirm an identity of the refining train IoT device that requested the device data.

A seventh aspect includes any of the first aspect through the sixth aspect, wherein the logic further causes the hydrocarbon refining train IIoT system to provide a service discovery component that is configured to detect refining train IoT devices and microservices on the first network.

An eighth aspect includes any of the first aspect through the seventh aspect, wherein the logic further causes the hydrocarbon refining train IIoT system to provide a management component that is configured to establish the tunnel with the refining train IoT device for communicating the device data.

A ninth aspect includes any of the first aspect through the eighth aspect, wherein the logic further causes the hydrocarbon refining train IIoT system to provide a static content component that is configured to store and transfer static device data.

A tenth aspect includes any of the first aspect through the ninth aspect, wherein the logic further causes the hydrocarbon refining train IIoT system to provide a content delivery network (CDN) that is configured to control a speed and volume of delivery of the device data.

An eleventh aspect includes a method comprising: creating a first microservice API that connects with a first plurality of networks of a first type that host a respective plurality of first internet of things (IoT) devices, wherein the first microservice API stores routing data associated with the respective plurality of first IoT devices; creating a second microservice API that connects with a second plurality of networks of a second type that host a respective plurality of second IoT devices, wherein the second microservice API stores routing data associated with the respective plurality of second IoT devices; receiving a request for device data from an IoT device, wherein the request includes a tag name, a network type, time data, and a requester identity; determining from the network type that the IoT device is located in one of the first plurality of networks; communicating the request to the first microservice API, wherein the first microservice API utilizes the routing data to determine which of the first plurality of networks the IoT device resides and establishes a tunnel with the IoT device; and receiving the device data via the tunnel.

A twelfth aspect includes the eleventh aspect, further comprising retrieving device data for end systems via ODATA services, DVR system, or a lab information system.

A thirteenth aspect includes the eleventh aspect and/or the twelfth aspect, further comprising isolating the device data and employing multi-level security.

A fourteenth aspect includes any of the eleventh aspect through the thirteenth aspect, wherein the multi-level security uses disk encryption and/or two-factor authentication.

A fifteenth aspect includes any of the eleventh aspect through the fourteenth aspect, further comprising utilizing a requester identity to determine whether the IoT device that requested the IoT device is authorized to access the device data.

A sixteenth aspect includes any of the eleventh aspect through the fifteenth aspect, further comprising creating a third microservice API that connects with a third plurality of networks of a third type that host a respective plurality of third IoT devices, wherein the third microservice API stores routing data associated with the respective plurality of third IoT devices.

A seventeenth aspect includes a non-transitory computer readable medium comprising computer readable instructions, which stores logic that, when executed by a computing device, causes the computing device to perform at least the following: create a first microservice API that connects with a first plurality of networks of a first type that host a respective plurality of first internet of things (IoT) devices, wherein the first microservice API stores routing data associated with the respective plurality of first IoT devices; create a second microservice API that connects with a second plurality of networks of a second type that host a respective plurality of second IoT devices, wherein the second microservice API stores routing data associated with the respective plurality of second IoT devices; receive a request for device data from a IoT device, wherein the request includes a tag name, a network type, time data, and a requester identity; determine from the network type that the IoT device is located in one of the first plurality of networks; communicate the request to the first microservice API, wherein the first microservice API utilizes the routing data to determine which of the first plurality of networks the IoT device resides and establishes a tunnel with the IoT device; and receive the device data via the tunnel.

An eighteenth aspect includes the seventeenth aspect, wherein the first microservice API includes at least one of the following a data historian service component, an open data protocol (ODATA) service component, a DVR system, or a lab information system.

A nineteenth aspect includes the seventeenth and/or eighteenth aspect, wherein the first microservice API utilizes the requester identity to determine whether the IoT device that requested the IoT device is authorized to access the device data.

A twentieth aspect includes any of the seventeenth aspect through the nineteenth aspect, wherein the logic further creates a third microservice API that connects with a third plurality of networks of a third type that host a respective plurality of third IoT devices, wherein the third microservice API stores routing data associated with the respective plurality of third IoT devices.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for enhancing manufacturing and industrial processes. It should also be understood that these embodiments are merely exemplary and are not intended to limit the scope of this disclosure.

What is claimed is:

1. A hydrocarbon refining train industrial internet of things (IIoT) system for providing an IIoT service, comprising:
   a first plurality of refining train internet of things (IoT) devices coupled to a first network of a first type;
   a second plurality of refining train IoT devices coupled to a second network of a second type;
   a first refining train parameter module coupled to at least one of the first plurality of IoT devices, the first refining train parameter module configured to request data for the at least one of the first plurality of refining train IoT devices;
   a second refining train parameter module coupled to at least one of the second plurality of refining train IoT devices, the second refining train parameter module configured to request data for the at least one of the first plurality of refining train IoT devices;
   a hydrocarbon refining train parameter control system that includes a processor, a refining train parameter memory, a memory component, and a refining train parameter output translation module, the memory component storing a refining train control architecture that, when executed by the processor, causes the hydrocarbon refining train IIoT system to perform at least the following:
      creating a first microservice API that connects with the first network that hosts the first plurality of refining train IoT devices, wherein the first microservice API stores routing data associated with the first plurality of refining train IoT devices;
      creating a second microservice API that connects with the second network of the second type that hosts the second plurality of refining train IoT devices, wherein the second microservice API stores routing data associated with the second plurality of refining train IoT devices;

receiving a request for device data for a refining train IoT device of the first plurality of IoT devices or the second plurality of refining train IoT devices, wherein the request includes a tag name, a network type, time data, and a requester identity;

determining from the network type that the refining train IoT device is located in the first network of a plurality of networks of the first type;

communicating the request from the refining train parameter output translation module to the first microservice API, wherein the first microservice API utilizes the routing data to determine which of the plurality of networks the refining train IoT device resides and establishes a tunnel with the refining train IoT device; and communicating, via the refining train parameter output translation module, the device data via the tunnel to the refining train IoT device;

wherein the logic further causes the hydrocarbon refining train IIoT system to provide a content delivery network (CDN) that is configured to control a speed and volume of delivery of the device data.

2. The hydrocarbon refining train IIoT system of claim 1, wherein the first microservice API includes at least one of the following a data historian service component, an open data protocol (ODATA) service component, a DVR system, or a lab information system.

3. The hydrocarbon refining train IIoT system of claim 1, wherein the first microservice API utilizes the requester identity to determine whether the refining train IoT device that requested the refining train IoT device is authorized to access the device data.

4. The hydrocarbon refining train IIoT system of claim 1, wherein the refining train control architecture further creates a third microservice API that connects with a third plurality of networks of a third type that host a respective plurality of third refining train IoT devices, wherein the third microservice API stores routing data associated with the respective plurality of third refining train IoT devices.

5. The hydrocarbon refining train IIoT system of claim 1, wherein the logic further causes the hydrocarbon refining train IIoT system to provide a service client that is configured to receive the request for the device data and provide the request to an refining train API gateway of the refining train control architecture.

6. The hydrocarbon refining train IIoT system of claim 1, wherein the logic further causes the hydrocarbon refining train IIoT system to provide an identity provider that is configured to confirm an identity of the refining train IoT device that requested the device data.

7. The hydrocarbon refining train IIoT system of claim 1, wherein the logic further causes the hydrocarbon refining train IIoT system to provide a service discovery component that is configured to detect refining train IoT devices and microservices on the first network.

8. The hydrocarbon refining train IIoT system of claim 1, wherein the logic further causes the hydrocarbon refining train IIoT system to provide a management component that is configured to establish the tunnel with the refining train IoT device for communicating the device data.

9. The hydrocarbon refining train IIoT system of claim 1, wherein the logic further causes the hydrocarbon refining train IIoT system to provide a static content component that is configured to store and transfer static device data.

10. A method comprising:
creating a first microservice API that connects with a first plurality of networks of a first type that host a respective plurality of first internet of things (IoT) devices, wherein the first microservice API stores routing data associated with the respective plurality of first IoT devices;

creating a second microservice API that connects with a second plurality of networks of a second type that host a respective plurality of second IoT devices, wherein the second microservice API stores routing data associated with the respective plurality of second IoT devices;

receiving a request for device data from an IoT device, wherein the request includes a tag name, a network type, time data, and a requester identity;

determining from the network type that the IoT device is located in one of the first plurality of networks;

communicating the request to the first microservice API, wherein the first microservice API utilizes the routing data to determine which of the first plurality of networks the IoT device resides and establishes a tunnel with the IoT device;

receiving the device data via the tunnel; and providing a content delivery network (CDN) that is configured to control a speed and volume of delivery of the device data.

11. The method of claim 10, further comprising retrieving device data for end systems via ODATA services, DVR system, or a lab information system.

12. The method of claim 10, further comprising isolating the device data and employing multi-level security.

13. The method of claim 12, wherein the multi-level security uses disk encryption and/or two-factor authentication.

14. The method of claim 10, further comprising utilizing a requester identity to determine whether the IoT device that requested the IoT device is authorized to access the device data.

15. The method of claim 10, further comprising creating a third microservice API that connects with a third plurality of networks of a third type that host a respective plurality of third IoT devices, wherein the third microservice API stores routing data associated with the respective plurality of third IoT devices.

16. A non-transitory computer readable medium comprising computer readable instructions, which stores logic that, when executed by a computing device, causes the computing device to perform at least the following:
creating a first microservice API that connects with a first plurality of networks of a first type that host a respective plurality of first internet of things (IoT) devices, wherein the first microservice API stores routing data associated with the respective plurality of first IoT devices;

creating a second microservice API that connects with a second plurality of networks of a second type that host a respective plurality of second IoT devices, wherein the second microservice API stores routing data associated with the respective plurality of second IoT devices;

receiving a request for device data from a IoT device, wherein the request includes a tag name, a network type, time data, and a requester identity;

determining from the network type that the IoT device is located in one of the first plurality of networks;

communicating the request to the first microservice API, wherein the first microservice API utilizes the routing data to determine which of the first plurality of networks the IoT device resides and establishes a tunnel with the IoT device;

receiving the device data via the tunnel; and providing a content delivery network (CDN) that is configured to control a speed and volume of delivery of the device data.

17. The non-transitory computer readable medium of claim 16, wherein the first microservice API includes at least one of the following a data historian service component, an open data protocol (ODATA) service component, a DVR system, or a lab information system.

18. The non-transitory computer readable medium of claim 16, wherein the first microservice API utilizes the requester identity to determine whether the IoT device that requested the IoT device is authorized to access the device data.

19. The non-transitory computer readable medium of claim 16, wherein the logic further creates a third microservice API that connects with a third plurality of networks of a third type that host a respective plurality of third IoT devices, wherein the third microservice API stores routing data associated with the respective plurality of third IoT devices.

* * * * *